No. 788,716. PATENTED MAY 2, 1905.
R. A. HAMMOND & F. E. WALDEN.
WORM GEARING.
APPLICATION FILED JULY 29, 1904.

WITNESSES
Fred. E. Dorr
J. E. Malony

INVENTORS
Robert A. Hammond
Frederick E. Walden
by Teschemacher
Atty

No. 788,716. Patented May 2, 1905.

UNITED STATES PATENT OFFICE.

ROBERT A. HAMMOND, OF SANDWICH, AND FREDERICK E. WALDEN, OF WORCESTER, MASSACHUSETTS.

WORM-GEARING.

SPECIFICATION forming part of Letters Patent No. 788,716, dated May 2, 1905.

Application filed July 29, 1904. Serial No. 218,766.

*To all whom it may concern:*

Be it known that we, ROBERT A. HAMMOND, of Sandwich, in the county of Barnstable, and FREDERICK E. WALDEN, of Worcester, in the county of Worcester, State of Massachusetts, citizens of the United States, have invented an Improvement in Worm-Gearing, of which the following is a specification.

Our invention has for its object to provide a simple mechanical device whereby a slide may be quickly engaged with a screw-threaded shaft, so as to be operable thereby, or instantly disengaged from said shaft, so that it can be freely slid back and forth thereon independently of the screw-threads thereof, thereby enabling the slide to be quickly adjusted upon the shaft from any position to another and again engaged therewith in such a manner that it can, if desired, be further adjusted to any degree of nicety by rotating said shaft.

Figure 1:
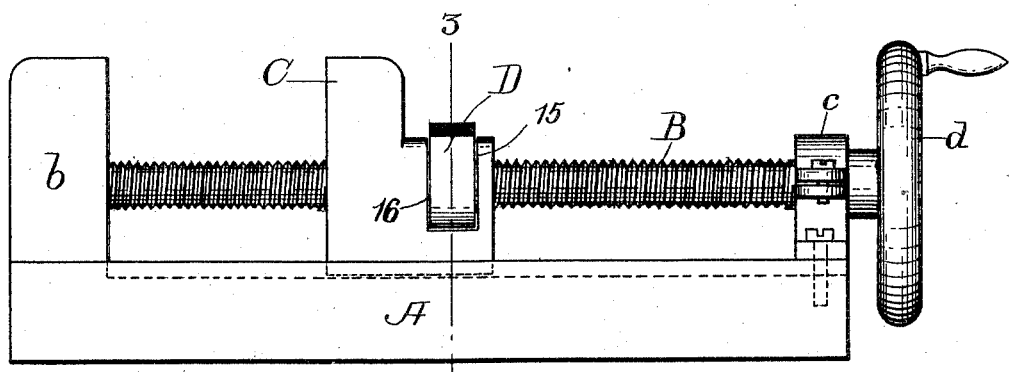
Figure 2:
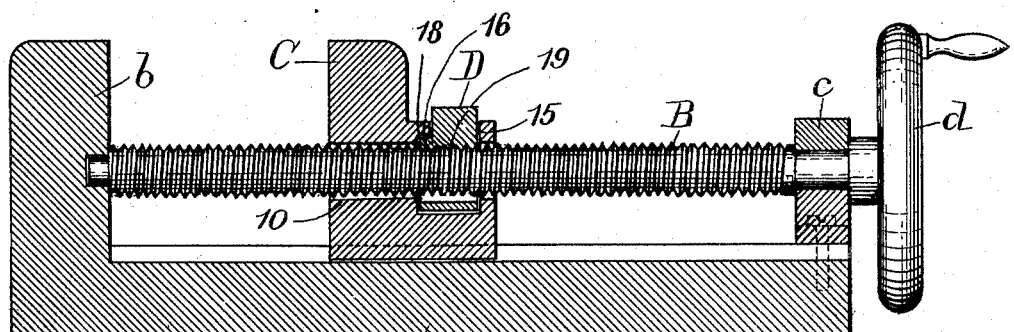
Figure 3:
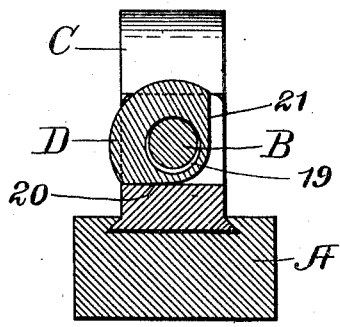
Figure 4:
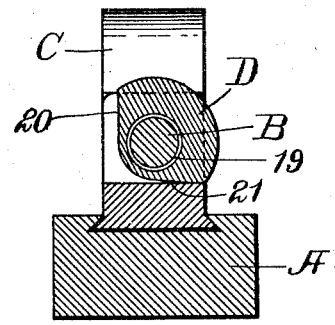
Figure 5:
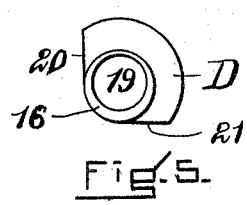

In the accompanying drawings, Figure 1 is a side elevation of a screw-shaft and slide embodying our invention. Fig. 2 is a longitudinal vertical section of the same. Fig. 3 is a section on the line 3 3 of Fig. 1, showing the position of the eccentric nut or thumb-piece when the slide is connected with the screw-shaft, so as to be operable thereby. Fig. 4 is a similar section showing the position of the eccentric nut or thumb-piece when the slide is disengaged from the screw-shaft and is free to move over the threads of the same. Fig. 5 is a plan view of the eccentric nut or thumb-piece.

In the said drawings, A represents a bed, from one end of which rises a solid upright or abutment $b$, in bearings in which and in a support $c$ at the opposite end of the bed is mounted a screw-threaded shaft or spindle B, provided with a hand-wheel $d$, by which it may be rotated. Upon this shaft A is mounted a slide C, having a non-threaded aperture or smooth bore 10 for the passage of the shaft B, said aperture being of greater diameter than that of the shaft, so that it can freely slide over its threads toward and from the abutment $b$. Within an open slot 15 at one end of the slide C is placed a sector-shaped oscillating nut or thumb-piece D, having on one side a circular projection or boss 16, forming a journal, which is fitted to turn in a bearing 18, formed by enlarging the adjacent end of the aperture 10 of the slide C. This thumb-piece D is provided with a screw-threaded aperture 19, through which passes the shaft B, said aperture being eccentric to the axis of the boss 16 and bearing in which it turns and being of slightly greater diameter than that of said screw-shaft, so that the said shaft can slide freely through the thumb-piece when the latter is turned into the position shown in Fig. 4, which brings the axis of its aperture 19 in line with the axis of the screw-shaft B, thus disengaging the threads of the thumb-piece from the threads of the shaft, and when in this position the slide C will be free to be quickly moved over the threads of the shaft B into any desired position thereon, after which by simply turning the thumb-piece a quarter-revolution its threaded aperture 19 will be brought into a position eccentric to the axis about which said thumb-piece turns in its bearing, causing its threads to engage the threads of the screw-shaft B on one side thereof, as shown in Fig. 3, thus connecting the slide with the shaft, when it can, if desired, be further adjusted to any degree of nicety by turning the shaft B by means of the hand-wheel $d$. The threads of the aperture 19 are preferably cut away on one side, as shown in Fig. 2, to further facilitate the free movement of the slide C when disconnected from the shaft B. The angular movement of the eccentric thumb-piece D in opposite directions is limited by the contact of its angular sides 20 21 with the end wall of the slide C, which thus forms a suitable stop for the purpose.

The above-described device may be advantageously applied to a variety of mechanisms—for instance, to parallel vises, clamps, and other machinery where it is desired to combine a sliding part or member with a screw-shaft in such manner that it can when desired be freely and quickly slid over the threads of said shaft to any desired position thereon and again quickly engaged therewith, so as to be operable in the ordinary manner by the rotation of the shaft.

What we claim as our invention, and desire to secure by Letters Patent, is—

1. In a device of the character described, the combination with a screw-threaded shaft, of a slide having a bore or aperture for the reception of said shaft, whereby it may be moved freely thereon in the direction of its length independently of the screw-threads, and an oscillating nut or thumb-piece journaled in said slide and having a screw-threaded aperture for the passage of the screw-shaft, said aperture being eccentric to the axis about which said nut or thumb-piece turns and having a diameter greater than that of said shaft so that the thumb-piece may slide freely thereon, whereby said slide may be engaged with or disengaged from said screw-shaft by an angular movement of said thumb-piece.

2. A device of the character described comprising a screw-threaded shaft, a slide having a smooth bore or aperture for the reception of said shaft, whereby it may be moved freely thereon in the direction of its length independently of the screw-threads, means for engaging said slide with and disengaging it from said screw-shaft, consisting of an oscillating nut or thumb-piece journaled in said slide and having a screw-threaded aperture for the passage of the screw-shaft, said aperture being eccentric to the axis about which said nut or thumb-piece turns and having a diameter greater than that of the screw-shaft, means for rotating said screw-shaft to effect a further adjustment of the slide thereon after being engaged therewith, and means for limiting the angular movement of the thumb-piece in either direction.

Witness our hands this 11th day of July, A. D. 1904.

ROBERT A. HAMMOND.
FREDERICK E. WALDEN.

In presence of—
P. E. TESCHEMACHER,
HENRY H. SULLIVAN.